J. GARVEY.
BREAD MAKING MACHINE.
APPLICATION FILED DEC. 22, 1913. RENEWED OCT. 31, 1917.

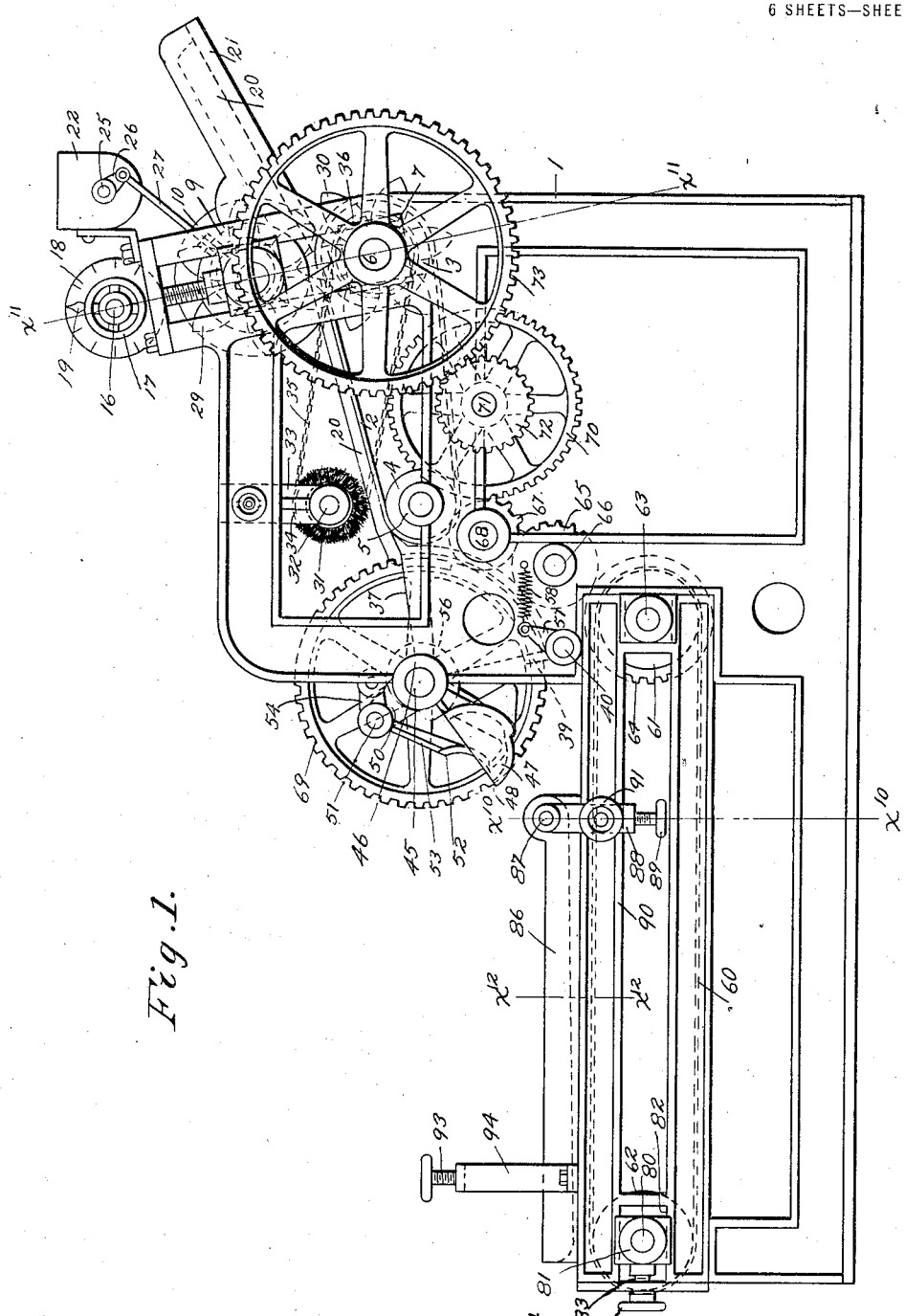

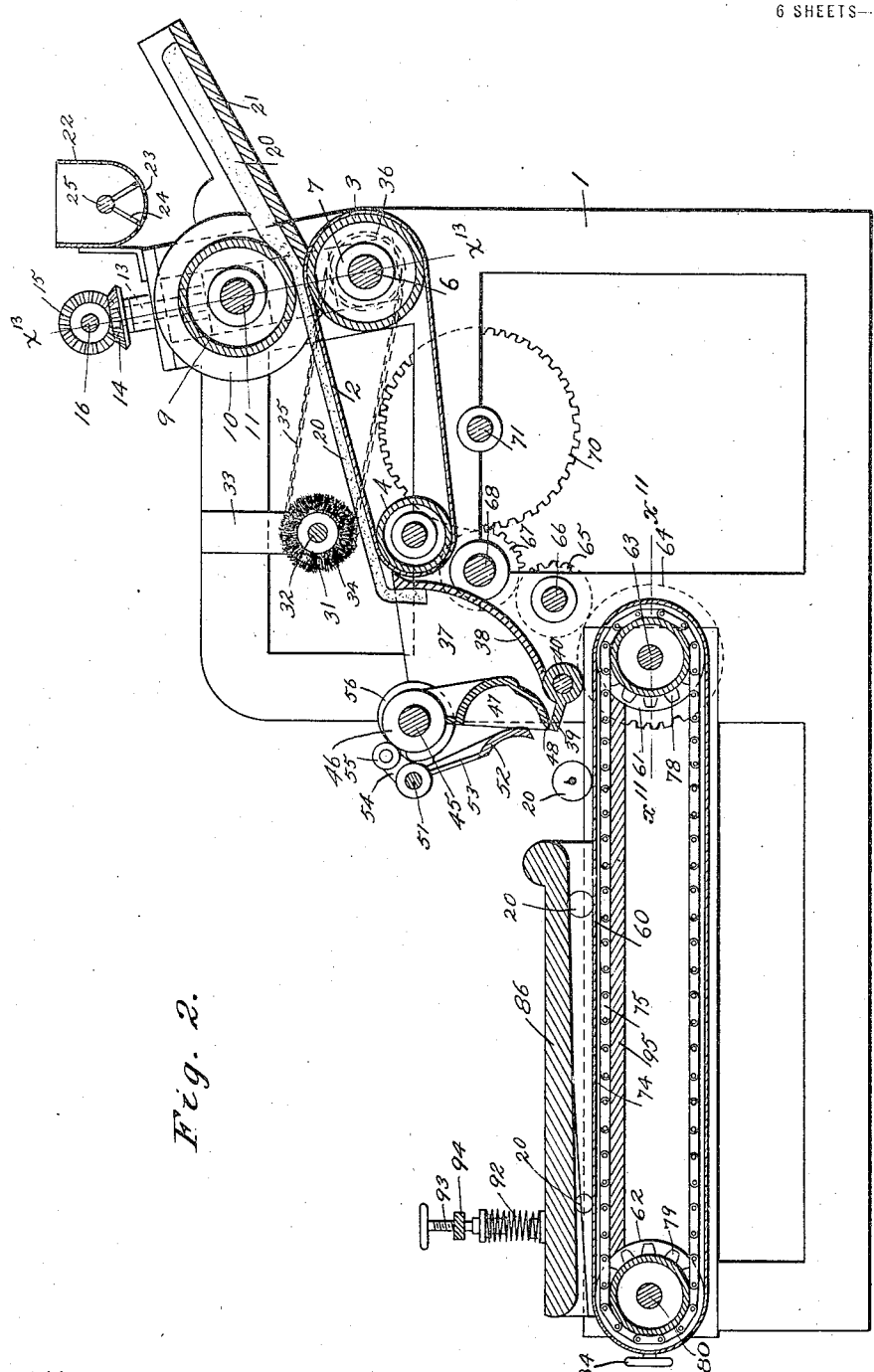

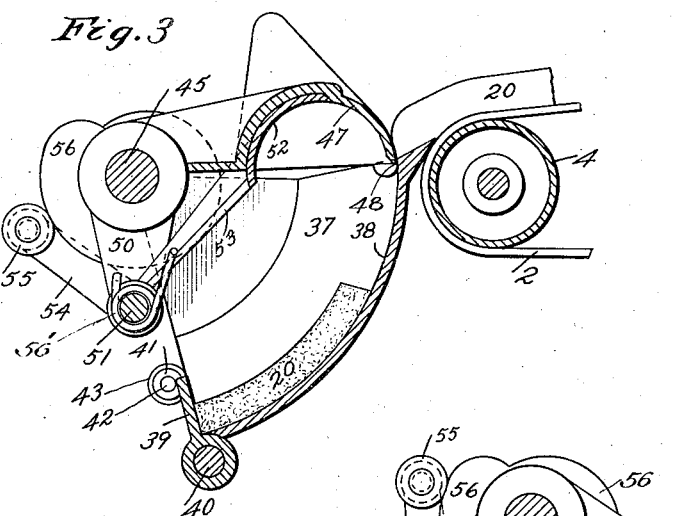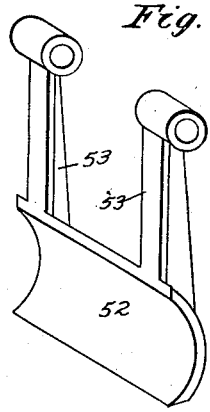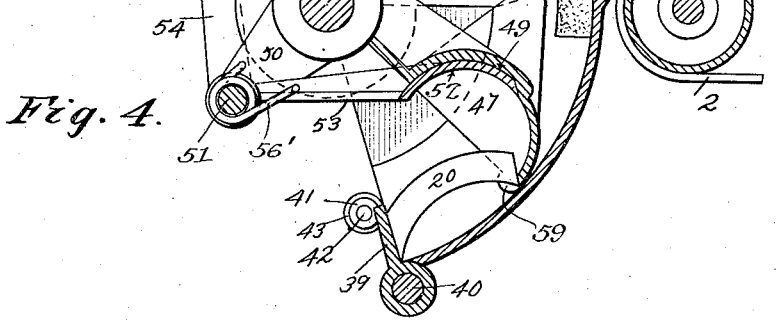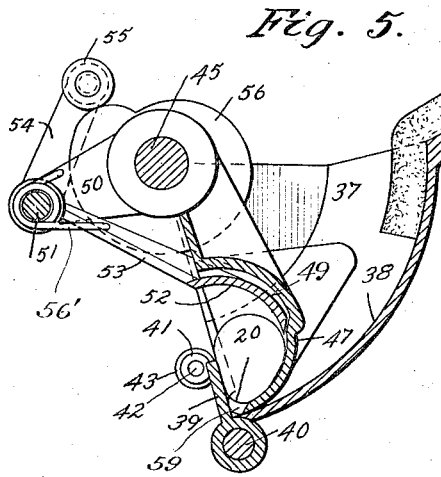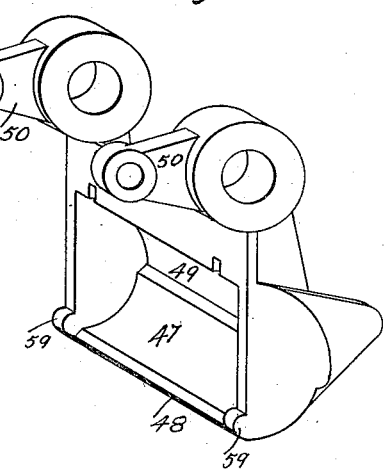

1,274,704.

Patented Aug. 6, 1918.
6 SHEETS—SHEET 4.

Witnesses.
H. Gearing.

Inventor.
James Garvey.
By
Attorneys.

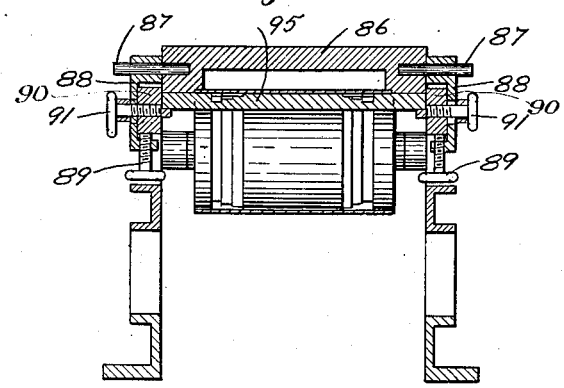
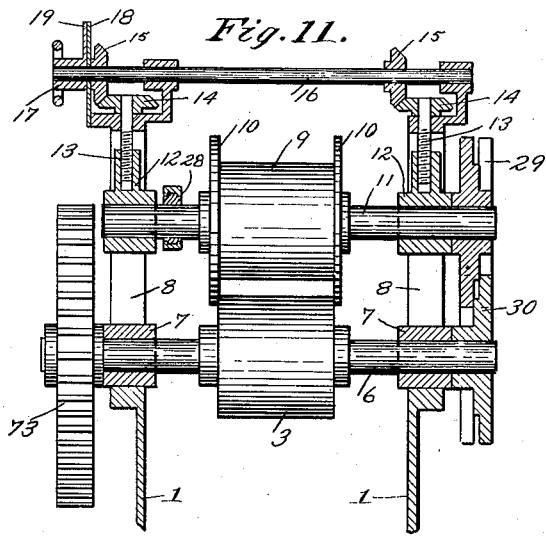
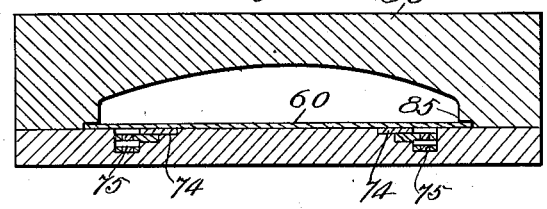

J. GARVEY.
BREAD MAKING MACHINE.
APPLICATION FILED DEC. 22, 1913. RENEWED OCT. 31, 1917.

1,274,704.  
Patented Aug. 6, 1918.  
6 SHEETS—SHEET 6.

Witnesses.  
H. Gearing.  
Lutie A. Alter.

Inventor,  
James Garvey.  
By Lyon & Hackley  
Attorneys.

UNITED STATES PATENT OFFICE.

JAMES GARVEY, OF LOS ANGELES, CALIFORNIA.

BREAD-MAKING MACHINE.

1,274,704.   Specification of Letters Patent.   Patented Aug. 6, 1918.

Application filed December 22, 1913, Serial No. 808,122. Renewed October 31, 1917. Serial No. 199,611.

*To all whom it may concern:*

Be it known that I, JAMES GARVEY, a citizen of the United States, residing at Los Angeles, in the county of Los Angeles and State of California, have invented a new and useful Bread-Making Machine, of which the following is a specification.

This invention relates to a bread making machine, and the object of the invention is to provide a machine in which all kinds of doughs of various weights and sizes can be handled with equally successful results.

A further object of the invention is to improve certain features in a patent issued to Beck, No. 1,054,600, March 11th, 1913. In the said Beck machine the dough would not always be moved out of the shaping member, but would lodge there and the succeeding portion of dough would pack therein, thus interrupting the operation of the machine until the obstruction had been removed. In my improved machine, I provide an ejector to positively push the dough out of the shaping member and thus avoid this difficulty.

Another object is to provide for making smaller sized loaves on the same machine by mere interchange of mold boards.

Referring to the drawings:

Figure 1 is a side elevation of the machine.

Fig. 2 is a vertical section of the machine.

Fig. 3 is a vertical section on an enlarged scale, through the cutoff mechanism, showing the parts in the position which they have when a cutoff portion of dough has slid to the bottom of the hopper and is retained by the gate.

Fig. 4 is a view similar to Fig. 3, showing the forming member as having partially rolled up the portion of dough.

Fig. 5 is a view similar to Fig. 3, showing the forming member as having completely rolled up the portion of dough, the rolled up portion not yet having been ejected.

Fig. 6 is a perspective of the ejector.

Fig. 7 is a perspective of the forming member.

Fig. 10 is a section on line $x^{10}$—$x^{10}$, Fig. 1.

Fig. 11 is a sectional view on line $x^{11}$—$x^{11}$, Fig. 2.

Fig. 12 is a section through the mold belt and mold board for French bread, on line $x^{12}$—$x^{12}$, Fig. 1.

Figure 8:
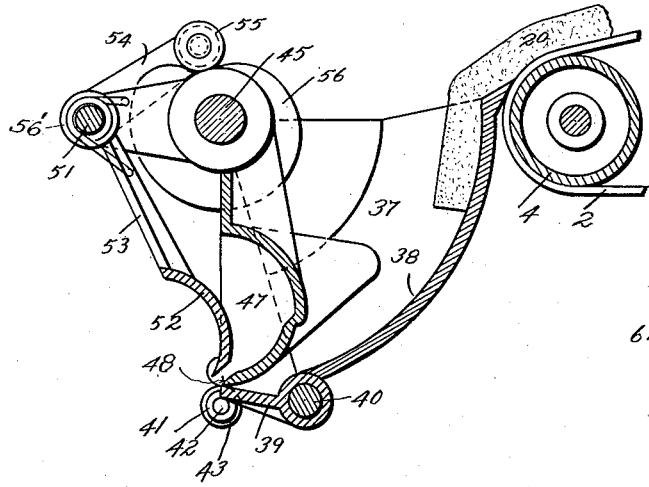
Fig. 8 is a view similar to Fig. 3, showing the ejector as having just ejected the rolled up portion of dough from the forming member.

1 designates the main frame of the machine at the receiving end of which is a dough feeding belt 2, which runs on rolls 3 and 4. The roll 4 is journaled in fixed bearings 5 on the frame of the machine, while the roll 3 is mounted on a shaft 6 which is journaled in bearings 7 which are located at the lower ends of slots 8 formed in the frame. Located above the roll 3 is a regulating roll 9 having flanges 10 which overlap the belt 2 and roll 3, and is mounted on a shaft 11 journaled in bearings 12 which are slidable in slots 8 and are vertically adjustable by means of screws 13 which have bevel gears 14 which mesh with bevel gears 15 on a shaft 16 provided with a hand wheel 17. By turning the hand wheel 17 the screws 13 will be revolved through the beforedescribed gearing to regulate the vertical adjustment of the roll 9, and in order to indicate the adjustment, a stationary dial 18 is secured to the frame 1 and a hand 19 is formed as part of the hub of the hand wheel 17 to indicate on the dial the adjustment of the roll 9.

Figure 13:
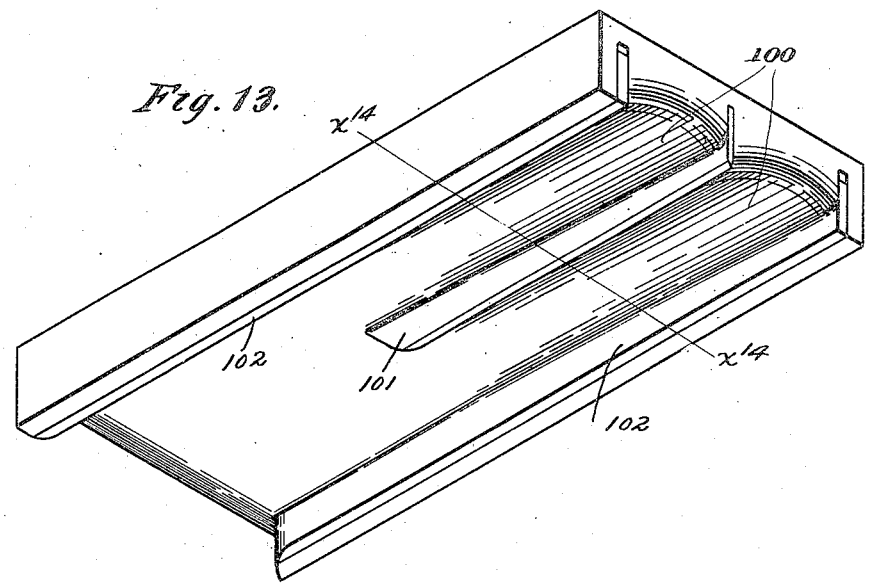
Fig. 13 is a perspective view of a modified form of mold board for making small loaves or rolls.

20 designates the strip of dough which is fed to the machine along an inclined trough 21 and the roll 9 acting in conjunction with the belt 2 acts to feed the strip of dough, and to give it the required thickness. Thus if a heavier loaf is required, the roll 9 may be adjusted to give a thicker dough strip and vice versa. The flanges 10 confine the strip to the proper width. 22 is a hopper for containing flour, the lower portion of the hopper having perforations 23, and an oscillating agitator 24 is located within the hopper to store the flour and cause it to properly sift through the perforations, the agitator 24 mounted on a shaft 25 having an arm 26 which is connected by an eccentric rod 27 with an eccentric 28 on the shaft 11, so that as the shaft 11 revolves, the agitator is oscillated. The regulating roll 9 is positively driven, there being a gear 29 on shaft 11 which meshes with a gear 30 on shaft 6, The gears 29 and 30 have long teeth as shown in Figs. 1 and 13, which enable the regulating roll 9 to be vertically adjusted without disengaging its gear 29 from gear 30.

The strip of dough after passing under the regulating roll 9 is carried forward by the feed belt 2 and to hold the strip of dough 20 properly against the belt 2 and insure the feeding action, a brush 31 is arranged in contact with the strip of dough, being mounted on a shaft 32 supported in brackets 33, and carries a sprocket 34 which is driven by a chain 35 from a sprocket 36 on shaft 6. This brush does not exert more than a slight pressure on the dough, just sufficient to hold it against the feed belt.

Figure 9:
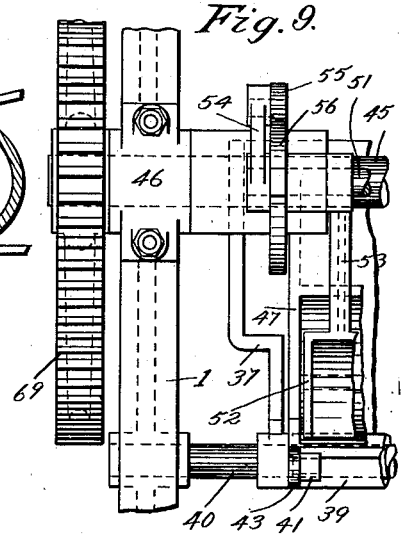
Fig. 9 is a front view of a portion of the cutoff mechanism.

From the feed belt 2 the strip of dough 20 passes into a stationary shaping member 37 which has a concave bottom 38. At the lower end of the shaping member 37 is a gate 39 shown in detail in Fig. 27, which is pivotally mounted on a shaft 40, and on its upper edge has two rearwardly projecting bosses 41 which support pins 42 and rotatable on each pin 42 is a roller 43, the gate 39 being slotted at 44 to receive the roller 43. The peripheries of the rollers 43 do not project beyond the front face of the gate 39. A shaft 45 with which the curved bottom 38 is concentric, is mounted in journals 46 on the frame 1, see Figs 1 and 9, and rigidly mounted on shaft 45 is a rotary forming member 47 which has a cutting edge 48, having a concave inner surface and is provided with a recess 49. The rotary forming member has two projecting brackets 50 in which is journaled a shaft 51. Rigidly mounted on the shaft 51 is an ejector 52 shown in detail in Fig. 6, the ejector being formed with two arms 53 which are secured to the shaft 51, and the ejector is provided with a concave face and is adapted to be received in the recess 49 of the forming member 47 during a certain interval in the operation of the machine. The shaft 51 has a rigid arm 54 with a roller 55 in the end thereof which is held against a stationary cam 56, by a spring 56'. The shaft 40 has an arm 57 outside the frame 1, as shown in Fig. 1, which is connected with a tension spring 58, the latter serving to yieldingly hold the gate 39 in the position shown in Figs. 3, 4 and 5. The former member 47 has a continuous rotating movement; the ejector 52 is carried around bodily with the forming member 47, and during such bodily movement the ejector 52 also has a swinging movement in relation to the forming member 47, at a certain period in the operation, this being accomplished by the stationary cam 56. The strip of dough 20 enters the stationary forming member 37 in the manner indicated in Fig. 8 and by the time the rotary forming member 47 has nearly reached the position shown in Fig. 3, the length of the strip of dough which has been fed into the stationary forming member is of the required amount to form the loaf. As the rotary forming member advances, its edge 48 cuts the strip of dough as indicated in Fig. 3 and the severed portion of dough slides down until its lower end is arrested by the gate 39. As the rotary forming member advances it pushes against the rear end of the severed strip of dough, as indicated in Fig. 4, and arches the strip of dough as indicated, and by the time the rotary forming member has reached the position shown in Fig. 5, it has folded the strip completely together, the gate 39 being held firmly in position during this operation by means of the spring 58. During this period the ejector 52 has remained seated in the recess 49, but when the parts reach the position shown in Fig. 5, the contour of the cam 56 is such that the arm 54 is just commencing to move inward and further forward movement of the rotary forming member causes rounded ears 59 to press against the gate 39 and swing the latter open, as the gate opens, the ears 59 riding over the rollers 43 as shown in Fig. 8, and coincidently with this opening of the gate 39, the ejector 52 is moved outward by means of cam 56 and ejects the roll of dough, the parts then being in the position shown in Fig. 8. As the rotary forming member 47 moves beyond the gate 39, the latter is automatically closed again by spring 58 and the ejector 52 is moved back into the recess 49 by the cam 56.

The roll of dough is delivered from the stationary forming member 37 onto a mold belt 60, as shown in Fig. 2. The mold belt 60 is supported on rollers 61 and 62, the roller 61 being secured to a shaft 63 which carries a gear 64 driven by an idler gear 65 mounted on a shaft 66, the idler gear 65 being driven from a driving gear 67 mounted on a shaft 68. The driving gear 67 meshes with a large gear 69 on shaft 45 for driving the latter, and the driving gear 67 also meshes with a large gear 70 on shaft 71 and on the other end of shaft 71 is a pinion 72 which meshes with a gear 73 on the shaft 6 for driving the latter.

On the inner side of each edge of the mold belt 60, a leather strip 74 is sewed, which reinforces the edges of the belt. The mold belt is positively driven by two chains 75, which mesh with sprockets 78 and 79 secured respectively to rolls 61 and 62. The roll 62 is mounted on a shaft 80 which is journaled in bearings 81 slidable in ways 82 in the frame 1, as shown in Fig. 1, and screws 83 operated by hand wheels 84 are provided for slidably regulating the bearings 81 to maintain the proper tension of the mold belt.

The edges of the convex belt preferably project beyond the leather strips 74 into rabbeted portions 85, formed in the lower edges of a mold board 86, one end of which is pivoted at 87 to vertically adjustable brackets 88 with adjusting screws 89 in their lower ends projecting upwardly against a stationary frame portion 90. As the rolls of dough travel on the mold belt along under the mold board 86, there is an upward pressure against the mold board which is resisted by the screws 89 which bear against the under side of the frame portion 90 and the screws 89 may be regulated to allow the board to rise to a greater or less degree. Horizontal screws 91 are provided which may be used to clamp the brackets 88 in position. The front end of the mold board is yieldingly held down by a spring 92, the tension of which may be adjusted by a screw 93 mounted in a yoke 94. The mold belt 60 is unyielding, being supported by a board 95 which is rabbeted to receive the leather strips 74 as shown in Fig. 10. Fig. 2 shows the board 95 extending the full length of the belt 60.

The roll of dough, see Fig. 2, is carried along by the belt 60 under the mold board, the entering end of the latter being rounded to permit the easy entrance of the roll, and the dough is rolled along under the mold board by the mold belt 60, the size of the roll being gradually diminished on account of the tapering of the mold board toward the belt 60, and when the roll emerges at the discharge end of the mold board, it is of the desired shape.

Figure 14:
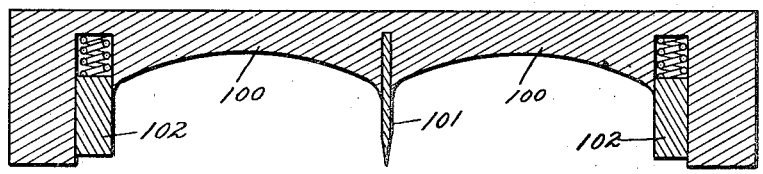
Fig. 14 is an enlarged cross section on line $x^{14}$—$x^{14}$, Fig. 13.
Figure 15:
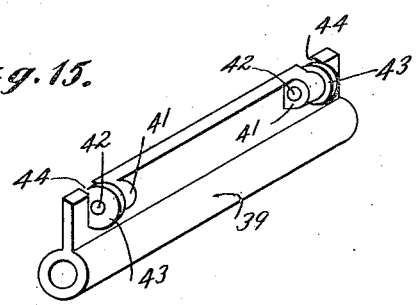
Fig. 15 is a perspective view in detail of the gate.

If it is desired to form small loaves in the machine, the mold board may be constructed double, as shown in Figs. 13 and 14, with two concave portions 100, and with a central longitudinal knife 101 between them. The roll from the machine enters of the full width and on reaching the knife 101 is cut at the center and each portion is independently given its shape in the two concave portions 100. Fig. 14 illustrates spring pressed bars 102 near the edges thereof which bear down against the belt 60 and form a perfect closure against the belt, preventing the dough from working in to form protuberances on the ends of the rolls of dough. The spring pressed bars 102 permit the adjustment of the elevation of the mold board without producing any opening at the edge of the belt into which the dough can press.

What I claim is:

1. A bread making machine having a pair of cutting, forming and folding members for receiving a strip of dough, cutting off a predetermined amount thereof and folding the cut off portion upon itself, and means for ejecting such folded dough from said members.

2. A bread making machine having a stationary forming member into which a strip of dough is delivered and a rotary forming member coacting therewith to cut off a portion of dough projecting into said stationary member and then fold the same in such stationary member, and means for ejecting the folded dough from said members.

3. In a bread making machine, a stationary forming member, means for feeding a strip of dough into said member, a rotary forming member coöperating with said stationary member and provided with means for cutting off the strip of dough projecting into said stationary member and for folding the same upon itself within said stationary member, an ejector, a stationary cam around which the ejector travels, and means on the ejector coöperating with said cam for actuating the ejector to move the folded dough out of the forming members.

4. In a bread making machine, a stationary forming member, a pivoted gate at the lower end thereof, a rotary forming member provided with means for cutting the dough, coöperating with said stationary forming member, means for yieldingly holding said gate closed to retain dough in the stationary forming member, an ejector carried by the rotary forming member, means for tilting the ejector with relation to the rotary forming member to eject the dough, said gate being operated by said rotary forming member.

5. In a bread making machine, a stationary forming member, a rotary forming member having a concave forming face with a recess, an ejector pivoted on said rotary forming member, said ejector adapted to be received in said recess, and means for tilting the ejector with relation to the rotary forming means to eject the dough.

6. In a bread making machine, a stationary forming member, a rotary forming member provided with dough cutting means and coöperating with the stationary member, brackets projecting from the rotary forming member, a shaft in said brackets, an ejector rigidly secured to said shaft, a rigid arm on said shaft, a stationary cam around which said arm travels, and spring means for holding said arm against said cam to cause the ejector to be tilted with relation to the rotary forming member, as the latter revolves to eject the dough therefrom.

7. In a bread making machine, in combination with a mold belt, a mold board above the mold belt, a slidable element to which said mold board is pivoted at one end, said slidable element permitting the pivoted end of said board to rise from the belt, spring means for yieldingly holding the other end of the mold board toward the belt, and means for regulating the sliding movement of said sliding element to regulate the rising movement of the pivoted end of the mold board.

8. In a bread making machine, in combination with a mold belt, rolls supporting the mold belt, a mold board above the mold belt, said mold board being provided with recesses receiving the edges of the mold belt, and spring pressed bars on the mold board yieldingly bearing against the edges of the belt to prevent the entrance of dough.

9. A bread making machine comprising a stationary forming member having a concave face down which the dough travels, a rotary forming member pivoted concentric with said stationary forming member and coöperating therewith and provided with means sweeping along the concave face of said stationary forming member and folding said dough, and means pivoted eccentric to said stationary forming member for ejecting the folded dough out of the forming members.

10. A bread making machine comprising a stationary forming member having a concave face down which the dough travels, a rotary forming member pivoted concentric with said stationary forming member and coöperating therewith by a sweeping movement along the concave face of said stationary forming member thereby folding the dough, a movable gate at the bottom of said stationary member, and ejector means pivoted eccentric to said stationary forming member for moving the folded dough out of said forming members.

11. A bread making machine having a pair of forming members for receiving a strip of dough, cutting off a predetermined amount thereof and then folding the cut off portion upon itself and having movable means carried by one of said members against which said dough rests as it is folded, means for positively ejecting said folded dough from said members, and operative connections whereby said movable means and said ejector means are operated simultaneously to effect the ejection of said folded dough.

12. In a bread making machine, a forming device comprising a pair of forming or folding members, means for forming dough into a strip and feeding a portion of the strip into one of said forming members, the second forming member being movably mounted to move with relation to the other forming member and to cut off the dough strip projecting thereinto and to fold the same, and ejector means for moving the folded dough from said forming device.

13. In a bread making machine, a stationary forming member having a concave face upon which the dough is adapted to lie, a rotary forming member pivoted concentric with said stationary forming member and coöperating therewith and provided with means sweeping along said concave dough supporting face for cutting the dough and folding it, and ejector means for moving the folded dough out of the rotary forming member.

14. In a bread making machine, a pair of rolls for forming the dough into a strip, means for adjusting said rolls with relation to each other to regulate the thickness of the dough strip, a forming and folding device into which said strip is passed from said rolls, means for cutting a predetermined portion from said strip, and means for ejecting the formed and folded dough.

15. A bread making machine having a forming and folding mechanism adapted to receive dough in strip form and cut and fold the same in predetermined sizes, a pair of rolls for forming the dough into a strip for delivering to said mechanism, means for adjusting said rolls relatively to each other to determine the weight of such strip, and ejector means for positively moving the folded dough from said forming and folding mechanism.

In testimony whereof, I have hereunto set my hand at Los Angeles, California, this 11th day of December, 1913.

JAMES GARVEY.

In presence of—
GEO. T. HACKLEY,
LORRAINE E. DURROW.